(12) United States Patent
Hosoi

(10) Patent No.: US 7,908,385 B2
(45) Date of Patent: *Mar. 15, 2011

(54) ELECTRONIC MAIL COMMUNICATING METHOD, APPARATUS AND SYSTEM USING FACSIMILE COMMUNICATION PROCEDURE

(75) Inventor: Eiichiroh Hosoi, Kawaguchi (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/388,330

(22) Filed: Feb. 18, 2009

(65) Prior Publication Data

US 2009/0157838 A1 Jun. 18, 2009

Related U.S. Application Data

(63) Continuation of application No. 10/021,787, filed on Dec. 17, 2001, now Pat. No. 7,533,147.

(30) Foreign Application Priority Data

Dec. 25, 2000 (JP) ................................. 2000-393737

(51) Int. Cl.
*G06F 15/16* (2006.01)

(52) U.S. Cl. ........ 709/227; 709/203; 709/221; 709/238; 709/250; 709/219; 709/217; 709/218; 709/204; 713/150; 713/183; 713/153; 370/400; 370/401; 370/428; 370/465; 370/354

(58) Field of Classification Search .......... 709/201–206, 709/217–221, 238, 250, 227; 370/466, 354, 370/412

See application file for complete search history.

(56) References Cited

U.S. PATENT DOCUMENTS

| | | | |
|---|---|---|---|
| 6,202,105 B1 | 3/2001 | Gates et al. | |
| 6,208,638 B1 * | 3/2001 | Rieley et al. | 370/354 |
| 6,279,051 B1 | 8/2001 | Gates et al. | |
| 6,396,848 B1 | 5/2002 | Ohta | |
| 6,545,768 B1 | 4/2003 | Matsubara et al. | |
| 6,600,750 B1 * | 7/2003 | Joffe et al. | 370/401 |
| 6,614,551 B1 | 9/2003 | Peek | |
| 6,622,174 B1 | 9/2003 | Ukita et al. | |
| 6,657,743 B1 | 12/2003 | Otsuka et al. | |
| 6,801,546 B1 | 10/2004 | Yoshida et al. | |
| 6,985,494 B2 | 1/2006 | Thompson | |

(Continued)

OTHER PUBLICATIONS

Hosoi, U.S. Appl. No. 10/021,787, JP920000428US1, Notice of Allowance and Fees Due, Jan. 7, 2009, 9 pages.

(Continued)

*Primary Examiner* — Jude J Jean Gilles
(74) *Attorney, Agent, or Firm* — Hoffman Warnick LLC

(57) ABSTRACT

A safe electronic mail system for electronic mail communication, realizing connection between mail servers using a dial-up line not through the Internet. The transmitting party is provided with a transmission mail server, a transmission client for generation electronic mail information, and a transmission agent, which is a client for transmitting via a dial-up line. The receiving party is provided with a reception mail server, a reception client which can be the final destination of electronic mail information, and a reception agent, which is a client for receiving via a dial-up line. The transmission agent transmits electronic mail whose final destination is a designated reception client to the reception agent via the dial-up line as a facsimile image, and the reception agent transfers a received electronic mail to the reception mail server.

10 Claims, 9 Drawing Sheets

U.S. PATENT DOCUMENTS

| | | |
|---|---|---|
| 7,142,550 B1 | 11/2006 | Umansky |
| 2001/0000301 A1 | 4/2001 | Zong et al. |
| 2002/0181496 A1* | 12/2002 | Narasimhan et al. ......... 370/466 |

OTHER PUBLICATIONS

Hosoi, U.S. Appl. No. 10/021,787, JP920000428US1, Office Action Communication, Sep. 5, 2008, 21 pages.
Hosoi, U.S. Appl. No. 10/021,787, JP920000428US1, Office Action Communication, Apr. 10, 2008, 22 pages.
Hosoi, U.S. Appl. No. 10/021,787, JP920000428US1, Office Action Communication, Aug. 9, 2007, 18 pages.
Hosoi, U.S. Appl. No. 10/021,787, JP920000428US1, Office Action Communication, Jan. 26, 2007, 15 pages.
Hosoi, U.S. Appl. No. 10/021,787, JP920000428US1, Office Action Communication, Aug. 9, 2006, 13 pages.
Hosoi, U.S. Appl. No. 10/021,787, JP920000428US1, Office Action Communication, Feb. 24, 2006, 15 pages.

* cited by examiner

FIG. 4

Typical content of address information table

| Account (51) | Dial number (52) | Genuine host name (53) | C S I (54) | Other T.30 information (56) |
|---|---|---|---|---|
| yamada | 048-253-4940 | there.com | 81482534940 | |
| shiki | 03-5474-6746 | that.com | 81354749746 | |
| sanada | 03-5474-9749 | sanako.com | 81354749742 | |
| katoh | 03-5474-9748 | akio.com | 91354747474 | |

41

ELECTRONIC MAIL COMMUNICATING METHOD, APPARATUS AND SYSTEM USING FACSIMILE COMMUNICATION PROCEDURE

The current application is a continuation application of co-pending U.S. patent application Ser. No. 10/021,787, filed on Dec. 17, 2001 now U.S. Pat. No. 7,533,147, which is hereby incorporated by reference.

FIELD OF THE INVENTION

The present invention relates to an electronic mail communicating system and method, and more specifically to an electronic mail communicating system and method for realizing communication by electronic mail via a switched line not through the Internet.

BACKGROUND

In recent years, along with the explosively spreading use of the Internet, electronic mail (e-mail) is extensively utilized as one of its applications. In this electronic mail communication, a client apparatus for transmitting mail (transmission client) registers its own address with a mail server apparatus (transmission server) in advance. When sending an e-mail, the transmission client, using the simple mail transfer protocol (SMTP) for instance, sends an e-mail message (mail) to which the mail address of the destination (destination address) is attached, to its own transmission server. Having accepted the mail, the transmission server checks the destination address, and transfers the mail to the mail server of the destination address (reception server). In this manner, the mail is delivered to a mail box in the reception server. The client apparatus receiving the mail (reception client) accesses its own mail box and, using the post office protocol (POP) for instance, retrieves mails stacked up in the mail box. In such electronic mail communication, even if the addressee is not present, mailed information is automatically accumulated in the mail box of the reception server, which is the receiving party. Therefore, e-mail is an excellent means of communication that is not constrained in time or space.

Thus, electronic mail communication via the Internet is extremely convenient as well as useful for diverse purposes, and the number of mail users via the Internet has dramatically increased in recent years, making it a common infrastructure technology in both societal and consumer life aspects. However, where the Internet is used as the communication line for exchanging electronic mail, there arises the grave problem of lack of confidentiality. Thus, when an electronic mail is sent via the Internet, the contents of the mail will be subject to the risk of being overseen, altered or destroyed by a third party. To eliminate this risk, sometimes a leased line may be used that does not traverse the Internet. Unfortunately, this entails a heavy burden of facility management.

If connection to the Internet is used in parallel, security with a firewall or the like would be additionally required.

It is also conceivable to introduce a virtual private network (VPN) which would take charge of fully encrypted communication at the physical network level for communication with specific addressees, such as important clients or suppliers. This VPN provides a method of using an open network, such as the Internet, as a private exclusive network, and requires the use of a network combined with VPN-dedicated routers and firewall products, a VPN-compatible protocol and the like. However, this would require all the electronic mail users involved in a specific mode of communication to use the same facilities, inevitably entailing the financial burdens of additional hardware and management and accordingly a lack of common usefulness.

Another method is to encrypt the text of the mail to be sent and the attached file or files and digitally sign the mail every time communication is initiated. However, such an arrangement would presuppose installation of the same software for encrypting, such as a public key, for both the transmission client and the reception client, and accordingly cannot be convenient for common use. The heavy load of encrypting on the computer would also pose a major problem.

Therefore, in the operational aspect, the Internet cannot be used for the exchange of confidential information in some cases, and as a matter of fact traditional mail, communication over switched lines and facsimile are still frequently used instead of electronic mail.

Thus, the conventional electronic mail system using the Internet cannot secure confidentiality by generally applicable arrangements. In view of this problem, it could be concluded that the connection least susceptible to overseeing, alteration or destruction of the communicated contents (secure-free connection) can be achieved by using a switched line, not through the Internet, for connection between mail servers, when sending a highly confidential electronic mail. This secure connection would require (1) that the switched line be connected only when it is being used for electronic mail communication and be fully open at other times, (2) that the other party to be dialed not be limited but the destination of each electronic mail be individually dialed and (3) that the connection be compatible with common operation with another mode of communication service, i.e. facsimile mail.

A conceivable way to meet these requirements is the use of a dial-up router for secure connection. This dial-up router is a device combining a function to access an Internet service provider and a function to connect to a LAN. A dial-up router automatically establishes connection at a request from a computer connected to a LAN for connection to the Internet and automatically cuts it off upon termination of the communication, and can connect a plurality of computers to the Internet at the same time without having to do any special setting. This dial-up router is usually compatible on its public line side with an ISDN line and on its LAN side with 10 Base-T of Ethernet (R). It involves less trouble and cost than to contract for a leased line for connection to a LAN or to connect the computers one by one to the Internet with a telephone line or the like.

However, for a dial-up router, the telephone number which is the destination of communication usually is fixed to a specific provider, and it is impossible to establish direct connection with another party with whom communication is desired from time to time. Its mechanism does not allow recognition of the particulars of intended communication, and cannot be expected to permit connection only during communication, for instance, dialing only at the time of starting mail transmission and cutting off the connection immediately after the end of transmission. Therefore, transmission and reception of an electronic mail by secure connection requires a function to establish connection only during the period of actual communication and ensure safe transmission and reception, such as the function of G3 facsimile (a communication apparatus according to the T.30 specification of the ITU-T Recommendation of the International Telecommunication Union (ITU)).

Most families and small offices use dial-up connections for mail communication. A dial-up connection is a form of connection using a public line for connection to, for instance, the Internet. By this way of connection, a user would enter into a contract with, for example, a service provider and establish connection to the provider with a modem or a terminal adapter (TA) via a subscriber telephone line or the INS network.

Now, in this way of electronic mail communication by dial-up connection, the line fee is charged as long as the line remains connected irrespective of the actual quantity of mail communication. In mail reception, it is a so-called general delivery system, which requires the addressee himself or herself to connect the line to check for and retrieve any delivered mail. Even when prompt processing is needed, such as in accepting an order, the pertinent electronic mail stays in the mail box of the reception server, i.e. in the POP server, which is the deposit station of electronic mail unless the receiver himself or herself actively picks it up. Solution of this problem requires uninterrupted connection, but this entails an extra telephone charge, which an ordinary family or a small business may be unable to afford. For instance, G3 facsimile has a function interlocked with the sender's action to automatically accept a message and cuts off the line connection as soon as the communication of the message ends (straightforward signaling function), but no existing electronic mail transmission/reception system has any such function, and a mechanism to enable the sender to immediately send an electronic mail to equipment ready to hand on the intended receiver's side is needed.

In view of the foregoing needs and limitations, an object of the present invention is to provide an electronic mail system excelling in safety, capable of establishing connection between mail servers, when sending an electronic mail, over a switched line without relying on the Internet.

Another object of the invention is to realize efficient electronic mail transmission/reception capable of reducing the turnaround time required for mail delivery.

Still another object is to realize electronic mail communication between mail servers for direct mail delivery using communication procedures based on a standard protocol, such as the one prescribed in the ITU-T Recommendation T-30.

SUMMARY

To achieve these and other objectives, according to the invention, an electronic mail system comprising a mail server and a transmission or reception client is augmented with an agent mechanism comprising dial-up transmission/reception and client functions. It is characterized in that electronic mail composed in the Internet communication form are sent back and forth by this agent mechanism using, for instance, the facsimile communication procedures according to the ITU-T Recommendation T-30, which is a general-purpose protocol. Thus, the present invention provides a method for communicating from a sender to a receiver electronic mail data used via a network, characterized in that it comprises the steps of (a) recognizing a dial number of the receiver corresponding destination address information attached to an electronic mail, (b) converting data in the electronic mail including character data and various attached files into an image form permitting facsimile communication, and (c) initiating a call to the receiver using the recognized dial number and transmitting the data of the electronic mail converted into the transmission image form to the receiver by the facsimile communication procedures.

If this step (b) here is characterized in that it determines the horizontal numbers of pixels and generates data by linking them with the horizontal number in vertical direction according to a specification based on the ITU-T Recommendation T-30, it will be preferable in that safe electronic mail communication can be realized by a simple formula without having to alter the standard facsimile communication protocol.

Further, the invention is superior in that, if this step (b) is characterized by the generation of data to be transmitted by using a mail body in which electronic mail data are recognized to be a series of binary values, a header indicating particulars of the transmission image form, and padding for linking the mail body and the header by adjusting the line width of the horizontal numbers of pixels, electronic mail including their text information can be transmitted by facsimile communication procedures. This header information can include, for instance, the file length, width information, header length and padding length, and the receiving party having received a mail can convert the received data into an electronic mail form by analyzing this header information.

It is to be further noted that the transmission image form into which conversion takes place at the conversion step involves no development into a bit map image. Thus it can be defined to be something different from conversion of characters, GIF or JPEG data or the like into a facsimile image as a visible data form as in usual facsimile communication.

Viewed from another aspect, an electronic mail communicating method to which the invention is applicable comprises the steps of: (a) retrieving mail information stored in a server to be transmitted over a switched line from the server; (b) selecting a specification of communication needed for communication over the switched line from a network address contained in the retrieved mail information; and (c) initiating a call to the switched line using the selected specification of communication, and transmitting the mail information according to general-purpose facsimile communication procedures to a receiving apparatus connected via this switched line.

The retrieving step (a) can be characterized by the recognition that the mail information is to be transmitted from the network address account via the switched line but not via the Internet. For instance, the address of the client who is the destination of the transmission of mail information can be added besides the final destination address. The selection of the specification of communication can be so composed as to select the dial number of a receiving apparatus capable of receiving mail information by communication based on the ITU-T Recommendation T-30 at a reception network, according to the final destination address.

On the other hand, an electronic mail communicating method to which the invention is applicable comprises the steps of: (a) receiving data containing electronic mail information converted into an image form permitting facsimile communication from a sender by general-purpose facsimile communication procedures; (b) converting the received data into electronic mail information; (c) analyzing a destination contained in the electronic mail information based on the converted electronic mail information; (d) generating reply information to the received and converted electronic mail information; and (e) converting the generated reply information into the transmission image form and sent to the sender.

If it is characterized in that, if a terminal with a corresponding destination to the analyzed destination is not connected to an internal network, the reply information representing the absence of any relevant destination for the sender is generated, the sender is enabled to recognize destination absence information as in usual transmission/reception of an electronic mail via the Internet.

Or if received data contain no electronic mail information, a usual facsimile reception operation will take place.

According to the invention, there is also provided an electronic mail transmitting apparatus for transmitting electronic mail data to a receiver using a switched line not through the Internet, comprising: a communication specification determination unit for determining the specification of communication on receiver side needed for communication over the switched line based on destination address information for external network data such as the Internet assigned to an electronic mail; a conversion unit for converting electronic mail data into the data form to be transmitted into a data form needed for communication over the switched line; and a transmission unit for transmitting to the receiver, in accordance with the determination specification of communication, using only the switched line without using the Internet.

This communication specification determination unit here can be characterized in that correspondence information among destination address information for a network assigned to electronic mail data, a dial number of the receiver and a communication procedure based on the ITU-T Recommendation T-30 is stored in advance as address table information for instance, and the specification of communication is determined based on the stored correspondence information. This configuration makes possible unique determination of the telephone number and the like according to the final destination address information.

If this conversion unit is so characterized that it considers data contained in the electronic mail data as a series of binary values, and converts the data form by adjusting the line widths, which are the horizontal numbers of pixels, such that it conforms the general-purpose facsimile communication procedures, it will be preferable in that electronic mail information can be transmitted as a general-purpose pseudo-image file of the ITU-T Recommendation T-30 protocol.

Viewed from another aspect, an electronic mail transmitting apparatus to which the invention is applicable may have the following constitution. Thus, this electronic mail transmitting apparatus is characterized in that it comprises: a mail retrieving unit for picking up from a server mail information to be transmitted over a switched line not through the Internet, a communication specification determination unit for determining the specification of communication needed for communication over the switched line based on a network address contained in the picked-up mail information; and a transmission unit for initiating a call on the switched line using the determined specification of communication and transmitting the mail information to a receiving apparatus connected via the switched line by communication based on general-purpose facsimile communication procedures.

This mail retrieving unit here is characterized in that it recognizes its destination described for communication to pass via this unit as well as a description of the final destination in the network address account, and retrieves the mail information. This constitution is excellent in that, for instance, a transmission client requesting transmission of an electronic mail can safely transmit a confidential electronic mail only by adding the destination of a transmission agent performing communication based on the ITU-T Recommendation T-30 to the description of the final destination.

On the other hand, a mail receiving apparatus according to the invention is characterized in that it receives electronic mail data converted into a form permitting facsimile communication from a sender via a switched line not through the Internet, and comprises: a receiving unit for receiving data from the sender via the switched line by general-purpose facsimile communication procedures; a restoring unit for restoring the received data into electronic mail data; and a transferring unit for transferring the restored electronic mail data to a server connected to an internal network.

The apparatus may be further characterized in that it additionally comprises: a destination recognition unit for recognizing a destination out of the restored electronic mail data; and a notification unit for sending, if the recognized destination doesn't exist in the internal network, information on no destination to the sender.

Further, an electronic mail communication system according to the invention comprises: a transmission mail server connected to the Internet; a transmission client connected to the transmission mail server to instruct transmission of electronic mail; and a transmission agent to function as a client to the transmission mail server, wherein this transmission client outputs, to the transmission mail server, electronic mail data containing the description of the destination of the transmission agent as well as a description of the final mail destination, and the transmission agent retrieves electronic mail data in which its destination is described from the mail server and transmits the electronic mail data over a switched line using facsimile communication procedures.

On the other hand, according to the invention, there is provided an electronic mail communicating system for transmitting/receiving electronic mail information between an internal network on a sender side and an internal network on a receiver side, wherein this internal network of the sender side comprises: a transmission mail server; a transmission client for generating electronic mail information; and a transmission agent which is a client having a function for transmitting the electronic mail information via a switched line not through the Internet, the internal network of the receiving party comprises: a reception mail server; a reception client which can be the final destination of electronic mail information, and a reception agent which is a client having a function for receiving the electronic mail information via the switched line not through the Internet, this transmission agent transmits an electronic mail message whose final destination is a designated reception client to the reception agent via the switched line not through the Internet, and the reception agent transfers the received electronic mail to the reception mail server.

BRIEF DESCRIPTION OF THE DRAWINGS

FIG. 4 is a diagram illustrating one example of the address information table 41;

DETAILED DESCRIPTION

The present invention will be described in detail below with reference to an exemplary embodiment thereof illustrated in accompanying drawings.

Figure 1:
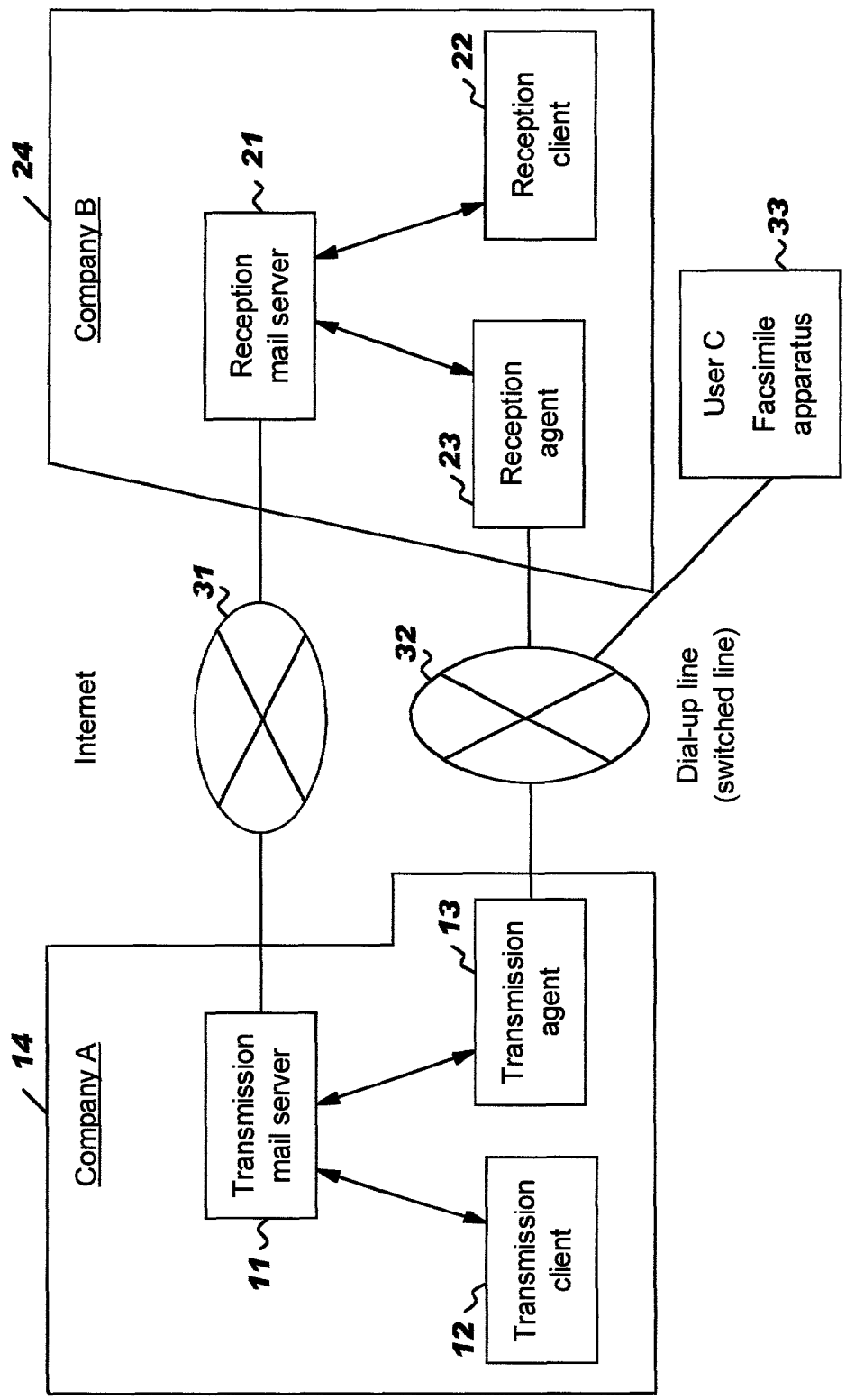
FIG. 1 is a diagram illustrating an electronic mail system to which the invention is applicable.

FIG. 1 illustrates the overall constitution of an electronic mail system to which the invention is applicable. FIG. 1 shows a case in which, for example, Company A 14 and Company B 24 are operating electronic mail systems, wherein Company A 14 and Company B 24 can transmit or receive electronic mail via the Internet 31, which is an external network. Further in this embodiment, transmission/reception of electronic mail is made possible via a dial-up line (switched line) 32 not through the Internet 31. This dial-up line (switched line) 32 may be a public communication line available from NTT (Nippon Telegraph and Telephone Corporation) or the like. The Company A side comprises a transmission mail server 11 connected to the Internet 31, a transmission client 12 for generating a transmission mail and requesting the transmission mail server 11 to transmit it, and a transmission agent 13, connected to the dial-up line 32, for transmitting an electronic mail to Company B 24 in accordance with the ITU-T Recommendation T-30 protocol at the request of the transmission mail server 11. These elements constitute an internal network. The transmission agent 13, having a client function for the transmission mail server 11 augmented with an agent function and a setting function, can be positioned as a facsimile server.

On the part of Company B 24 on the other hand, an internal network includes a reception mail server 21 connected to the Internet 31, a reception client 22 for picking up an electronic mail from the reception mail server 21, and a reception agent 23, connected to the dial-up line 32, for receiving an electronic mail transmitted in accordance with the ITU-T Recommendation T-30 protocol and handing over the received electronic mail to the reception mail server 21. This reception agent 23, which is one of the clients to the reception mail server 21, functions as a facsimile server. A facsimile apparatus 33 of a third party user C is also connected to the dial-up line 32.

First, when the transmission client 12 is to transmit an electronic mail to the reception client 22 via the Internet 31, as according to the prior art, in order to make possible reception in accordance with a post office protocol (POP) for instance, the electronic mail is sent from the transmission mail server 11 to the reception mail server 21, which is a POP server. The electronic mail having arrived at the reception mail server 21 is retrieved by an operation of the reception client 22. In this case, if the reception mail server 21 and the reception client 22 are connected by a LAN, access is possible at any time, and accordingly the electronic mail can be picked with little time lag, though the content is not forcibly displayed upon transmission. Nor is there any safety guarantee because the transmission takes place via the Internet 31.

On the other hand in this embodiment, the transmission client 12 can give an instruction to the transmission mail server 11 to transmit an electronic mail with a routing designation to transmit it via the dial-up line 32. In such a case, the transmission mail server 11 gives a transmitting instruction to send the electronic mail not via the Internet 31 but with a designation of the transmission agent 13. The transmission agent 13 converts the text information of the electronic mail, including tag information, into image data, which are transmitted to the reception agent 23 via the dial-up line 32. This conversion into image data is accomplished by fitting the binary data into the facsimile communication form as they are without involving a step of developing electronic mail information into a bit map image. For the transmission/reception of data, a general-purpose protocol prescribed in the ITU-T Recommendation T-30 is used as in usual transmission/reception between G3 facsimile apparatuses.

The reception agent 23, having received the electronic mail converted into image data, recognizes tag information in the data, and can thereby know that the information that follows is electronic mail information. The reception agent 23, on the basis of the recognized tag information, converts the electronic mail in the image data form into text information, and outputs it to the reception mail server 21 as an electronic mail. The reception client 22 can receive the electronic mail by accessing the reception mail server 21 in the same way as usual electronic mail reception.

Now it is supposed that, for instance, the transmission agent 13 dials a wrong number and electronic mail information is received by the facsimile apparatus 33 of user C having no part whatsoever in this communication. As this embodiment uses the common ITU-T Recommendation T-30 protocol, it is possible for user C's facsimile apparatus 33 to receive the data. However, user C's facsimile apparatus 33 cannot recognize the tag information contained in image data handled by this embodiment of the invention. Therefore, the received image data are handled like usual encoded image data, and decoded as such. As a result, user C cannot read the text information in the electronic mail which, though printed, is outputted in an unrecognizable state (e.g. consecutive stripes or the like). Thus, even if mail information is transmitted to a wrong destination, this embodiment can keep the contents of the electronic mail from leaking to any third party and thereby ensure its confidentiality.

Next will be described the functions and operations of the agents (the transmission agent 13 and the reception agent 23), which are characteristic constituent elements of this embodiment, with reference to FIG. 2 through FIG. 6.

Figure 2:
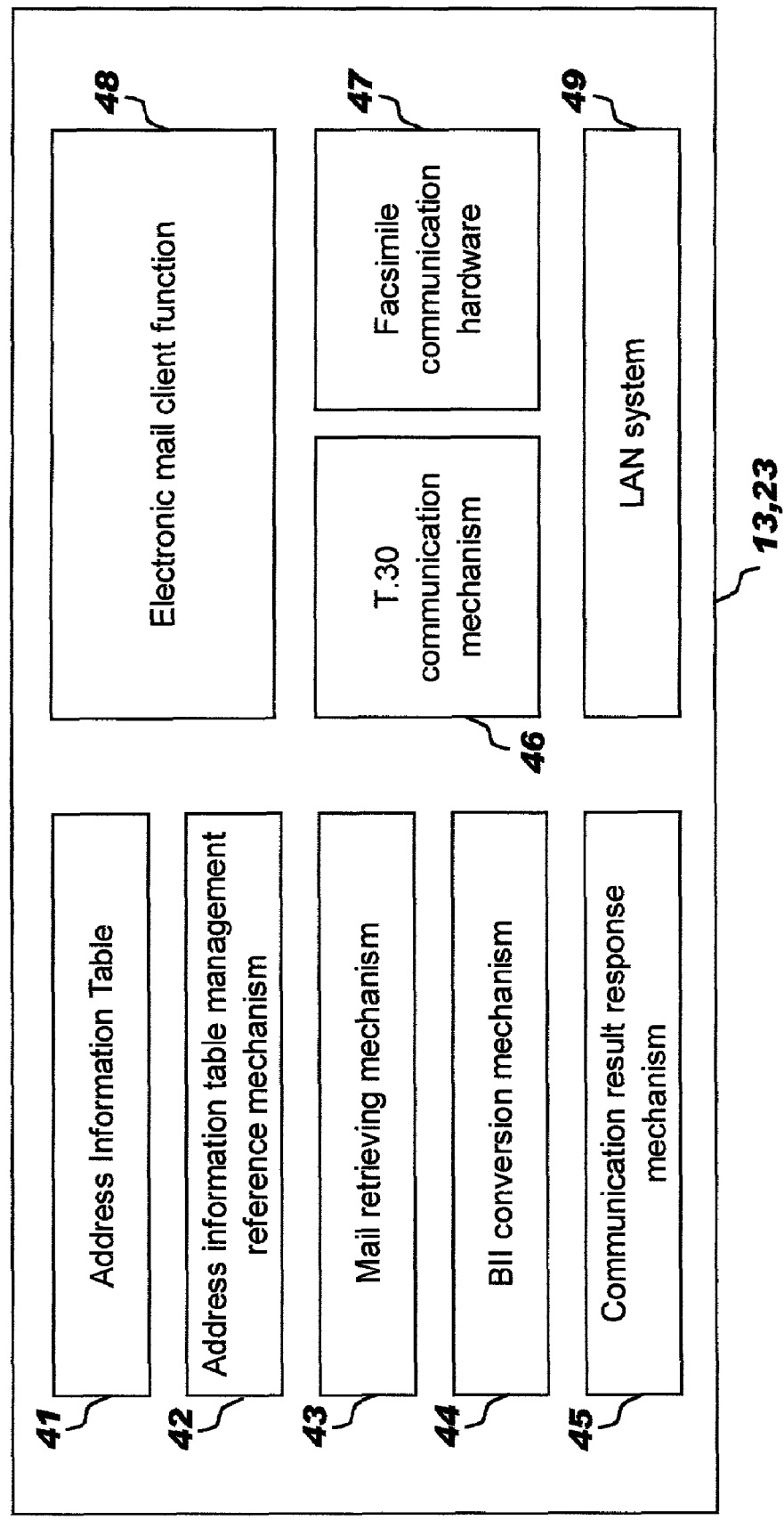
FIG. 2 is a diagram illustrating the functional constitution of agents (the transmission agent 13 and the reception agent 23)

FIG. 2 illustrates the functional constitution of the agents (the transmission agent 13 and the reception agent 23). As its functional elements, each of the agents is provided with an electronic mail client function 48 and a LAN system 49, which perform usual functions of a mail client. With this electronic mail client function 48, it can transmit or receive electronic mail as a client, and this LAN system 49 functions as an infrastructure for network connection purpose. The agent functions in this embodiment include an address information table 41 regarding address management, an address information table management referencing mechanism 42, a mail retrieving mechanism 43, a BII (binary in image) conversion mechanism 44, a communication result response mechanism 45, a T.30 communication mechanism 46, and facsimile communication hardware 47. Conceivable hardware constitutions for the transmission agent 13 and the reception agent 23 include a usual personal computer comprising a FAX engine or a FAX card, and agent applications. Another of many conceivable hardware constitution is a usual facsimile apparatus mounted with the functions enumerated above.

The address information table 41 has a comparative table for converting address information on an electronic mail destination into a telephone number. The address information table management referencing mechanism 42, after reading the destination information on an electronic mail in, references the address information table 41 to determine the telephone number of the destination having this destination information. The mail retrieving mechanism 43 monitors the presence of any electronic mail stored in a mail server (the transmission mail server 11) as delivered via the dial-up line 32 and, if any electronic mail is found, automatically picks it up. For example, if the destination accounts of electronic mail generated by the transmission client 12 contain an account beginning with "faxa13-" or one in which the transmission agent 13's address is included, it can be judged that this mail is to be transmitted via the transmission agent 13.

The BII conversion mechanism 44 subjects an electronic mail to be converted to image conversion into the BII (binary in image) form so that it can be transmitted in the standard T.30 image transmission mode. The communication result response mechanism 45 executes processing to reverse the transmitting right after BII transmission and to receive a response BII transmitted from the agent (e.g. the reception mail server 21) on the receiver side. The T.30 communication mechanism 46 has a function to perform transmission/reception processing including facsimile protocol and encoding processing based on the ITU-T Recommendation T-30 between the transmission agent 13 and the reception agent 23. The facsimile communication hardware 47 includes physical constituent elements necessary for facsimile communication, such as a modem.

Figure 3:
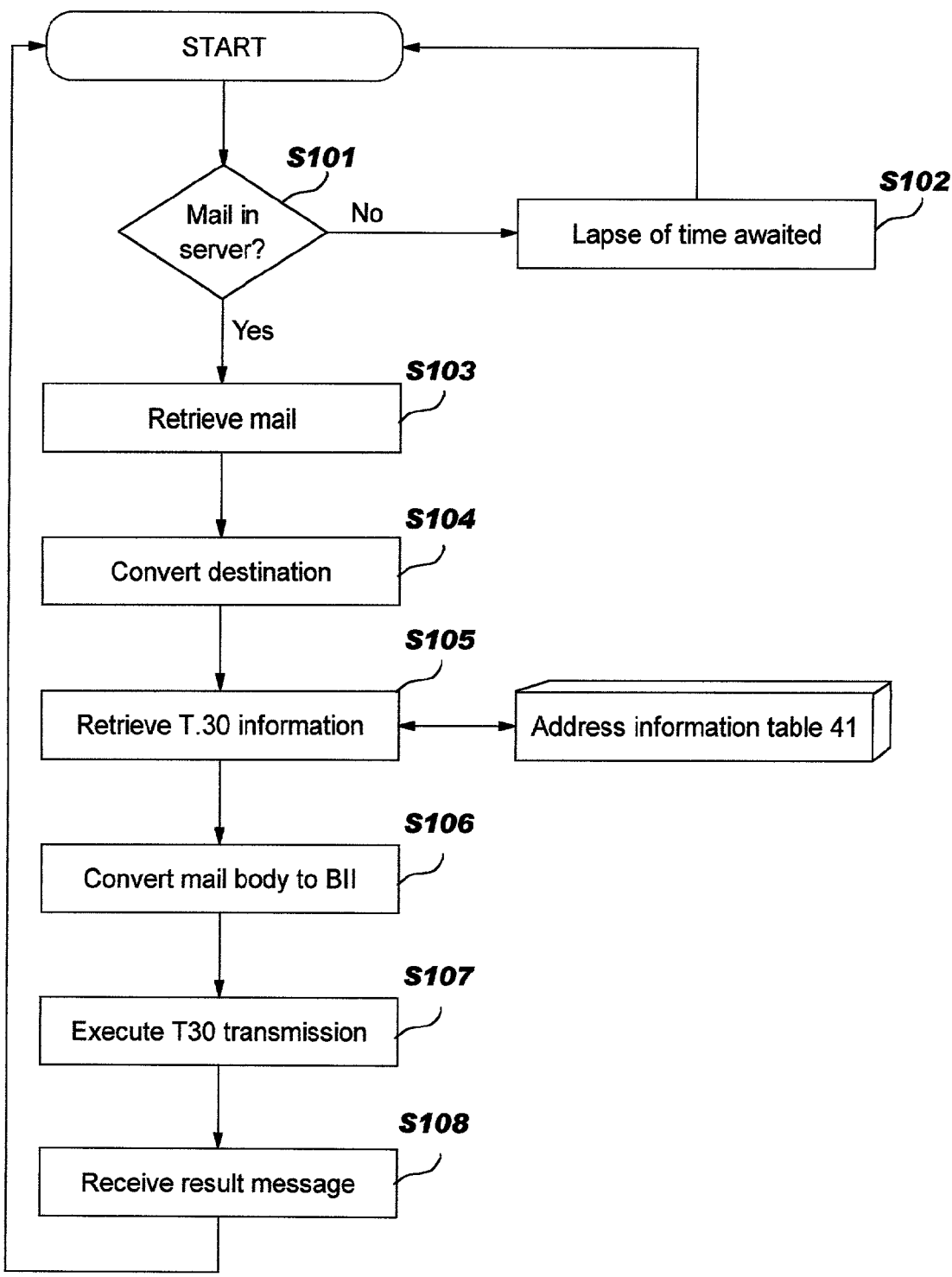
FIG. 3 shows a flowchart of processing by the transmission agent 13.

FIG. 3 is a flow chart of processing by the transmission agent 13. First, the transmission agent 13, with its mail retrieving mechanism 43, judges whether or not any electronic mail it has to transmit exists in the transmission mail server 11 (step 101), and monitors the arrival of any electronic mail at the transmission agent 13. If there is no electronic mail to be transmitted, the lapse of time is awaited (step 102), and judgment at step 101 is again made. If any electronic mail to be transmitted is found at step 101, the electronic mail is retrieved (step 103). Then, a comment is taken out of the address shown in the electronic mail to make it the original destination, and other aspects of destination conversion are done (step 104).

Next, the address information table 41 is referenced, and the address information table management referencing mechanism 42 extracts the telephone number, the type and quality of the line and other necessary information for T.30 (step 105). The BII conversion mechanism 44 subjects the electronic mail text to BII conversion (step 106). Then, transmission is executed using the protocol prescribed in T.30 (step 107). After that, the response BII generated by the reception agent 23 is received as a result message (step 108) to complete the sequence of processing, followed by a return to step 101 at the outset.

FIG. 4 illustrates an example of the address information table 41. Typical electronic mail would have items of address information including destination information and sender information, and a POP server would be selected according to this address information. However, since this embodiment transmits an electronic mail using a facsimile communication formula via the dial-up line 32 not through the Internet 31, address information on the electronic mail used on the Internet 31 by itself is inadequate. Therefore, the address information table 41 stores telephone numbers corresponding to destinations of electronic mails in a tabular form. Herein, accounts 51 which are information for identifying users, dial numbers (telephone numbers) 52 of agents (facsimile communication apparatuses) to be needed when connecting to the dial-up line 32, genuine host names 53 for use in connection to the Internet, called subscriber identification (CSI) information 52, one sign of which is provided to identify each account 51, and other T.30 information items 55 are stored, each associated with one account 51 or another.

Figure 5:
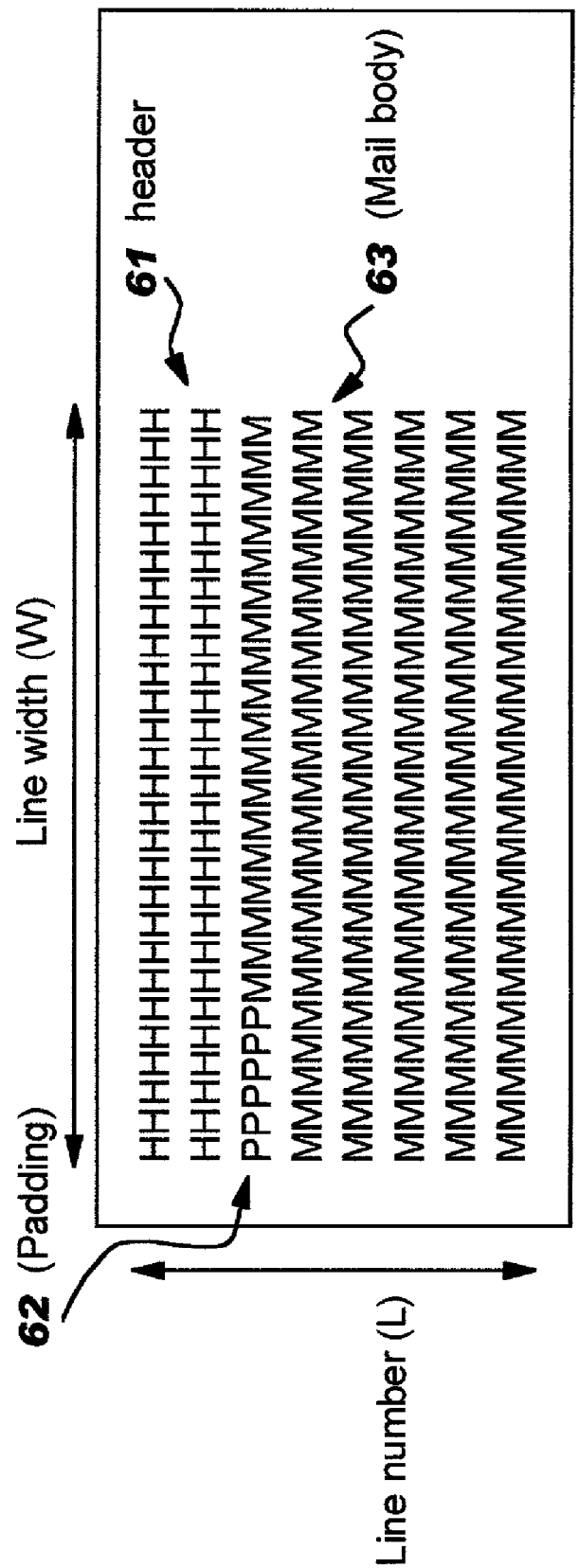
FIG. 5 is a diagram illustrating one example of transmitted image file form using BII (binary in image) in an exemplary embodiment of the invention.

FIG. 5 illustrates an example of transmitted image file using a BII (binary in image) form in this embodiment. Since transmission data under T.30 essentially derive from the signal-converted result of scanning and feeding a two-dimensional page in an A4, B4, A3 or any other size, the specification of transmit/receive data can be expressed in line width of the horizontal numbers of pixels (W) line number (L). The line width (W) can be selected out of:

2432 bits (304 bytes),
2048 bits (256 bytes),
1728 bits (216 bytes).

Unless otherwise specified, the line width (W) is set by default to 2048 bits (256 bytes). The line number (L) can be either the recording length on each page in the vertical direction or unlimited.

A BII in this embodiment consists of a header 61, a padding 62 and a mail body 63. Hs in FIG. 5 represent the header 61 part, Ps, the padding 62 part and Ms, the mail body 63 part. If the size of the mail text 63 fails to be an integral multiple of, for instance, 2048 bits (256 bytes), which is the line width (W) of the BII, the padding 62 will compensate for the difference. There is no limit to the line number (L) of the header 61. However, it is helpful to set Padding_length value (value of P), which is the length of the padding 62, and this value is set and shown in the header 61. A BII file that is finally made will have a normal format of, for instance, 2048 bits (256 bytes) in line width (W). At the same time, a computer file, such as a mail file consisting of character data and the like, is recognized to be a series of binary values, and become a general-purpose pseudo-image file which can be transferred according to T.30 by adding necessary information thereto.

Figure 6:
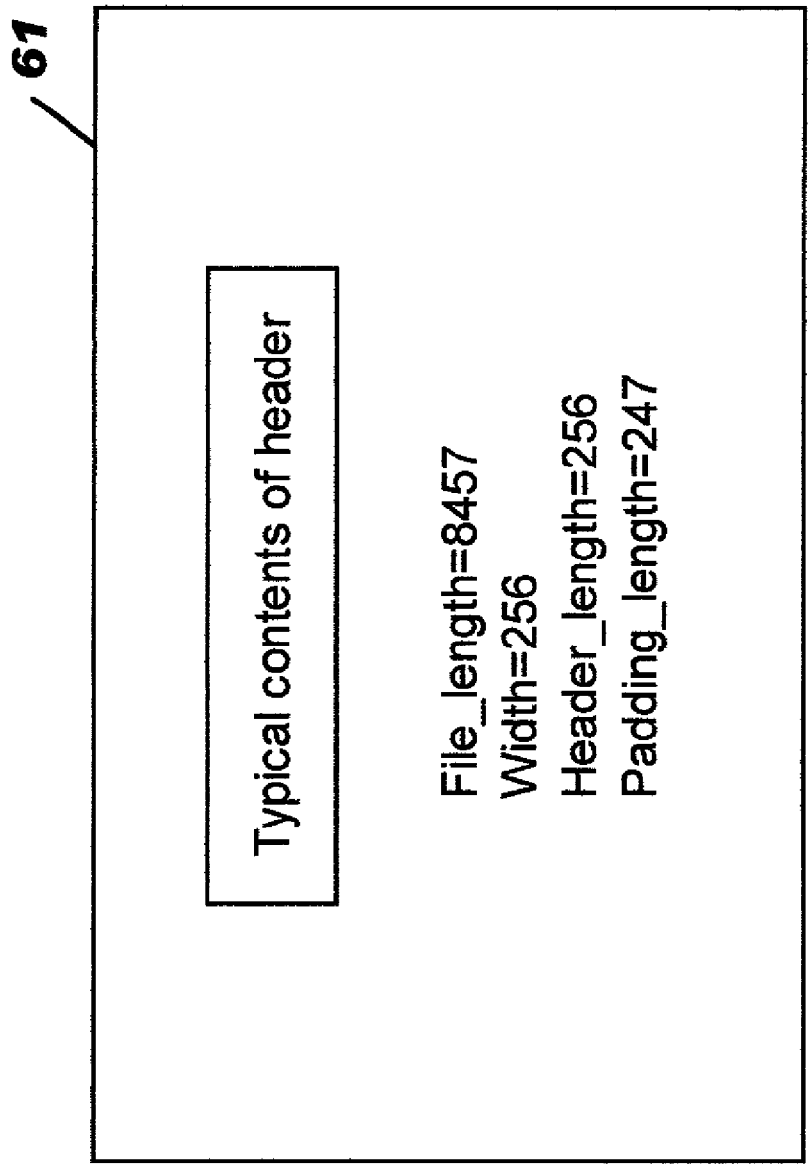
FIG. 6 is a diagram illustrating exemplary contents of the header 61 shown in FIG. 5.

FIG. 6 shows typical contents of the header 61 shown in FIG. 5. As information items of the header 61, for instance, "File_length" indicating the length of the file, "Width" indicating the line width (W) of the BII, "Header_length" indicating the length of the header 61, and "Padding_length" indicating the length of the padding 62 as mentioned above are shown. In FIG. 6, each value is expressed in bytes. These items of information in the header 61 can indicate, when the BII file is transferred from the transmission agent 13 to the reception agent 23, the transferred data are not usual image data but an electronic mail transmitted as an application of this embodiment. These information items in the header 61 are also used in developing the BII file transferred by the reception agent 23.

The BII file generated as described above is encoded into a compressed image form so that it can be actually transmitted in accordance with the T.30 protocol. Thus, according to this formula, data which have been created by encoding (compressing) a sequence of pixels set to a width of, for instance, 2048 bits (256 bytes) by an established method are transmitted and received using the T.30 protocol. The encoding method to be used here can be selected from, for example, MH (Modified Huffman), MR (Modified READ) and MMR (Modified MR) encoding methods, though MH encoding is preferable unless otherwise specified. This is because the compression ratio of MMR is not necessarily the highest for usual binary files though MMR is the highest for general image data, and accordingly MH which references no preceding line is considered more preferable.

Figure 7:
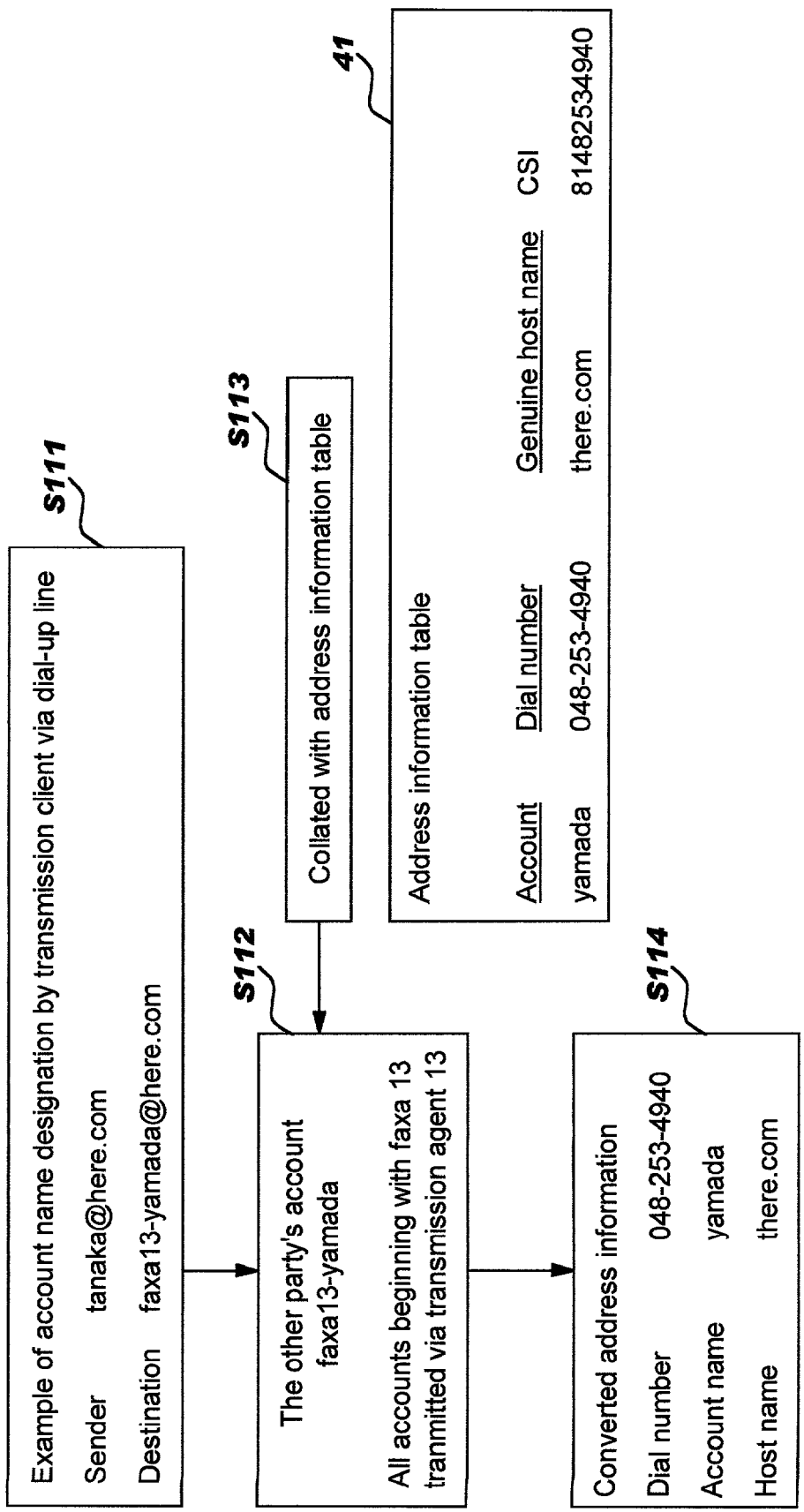
FIG. 7 shows a flowchart of address conversion in an exemplary embodiment.

FIG. 7 charts the flow of address conversion in this embodiment. At step 111 of FIG. 7 is shown a case in which an account name is designated via the dial-up line 32 by Company A's transmission client 12. The host name of the transmission client 12 is supposed to be "here.com". It is supposed that "tanaka" who is the transmission client 12 desires to send an electronic mail via a switched line to the account of "yamada" whose host name is "there.com" in another electronic mail system. When "tanaka" is to transmit via the transmission agent 13, which is a facsimile server, it designates the other party's account as "faxa13-yamada" and its host name to be the same as its own, "here.com".

Next, it being assumed that every account beginning with "faxa13", like the other party's account "faxa13-yamada", is to be transmitted via the transmission agent 13, the mail retrieving mechanism 43 of the transmission agent 13 retrieves an electronic mail from the transmission mail server 11 (step 112). Then, the address information table management referencing mechanism 42 of the transmission agent 13 performs correlation with the address information table 41 (step 113) and converts the address. The results of conversion include the dial number, the account name and the host name of the text (step 114), and they are handed over to the T.30 communication mechanism 46 and the BII conversion mechanism 44.

It is also possible to use some other form than that of the address shown in this FIG. 7. Thus, where the transmission client 12 requires transmission via the dial-up line 32, the destination can be described in the manner of destination description of transmission via the transmission agent 13. For instance, a destination description of transmission via the transmission agent 13 can be designated, for example, the final destination (yamada@bbb.co.jp) in a standard comment and the destination (agent@aaa.co.jp) of the transmission agent 13 as the direct destination can be designated, such as yamada@bbb.co.jp agent aaa.co.jp instead of the usual address (account name+the host name (e.g. yamada@bbb.co.jp)). Thus, the electronic mail is once transmitted to the transmission agent 13 to entrust transmission via the dial-up line 32.

Figure 8:
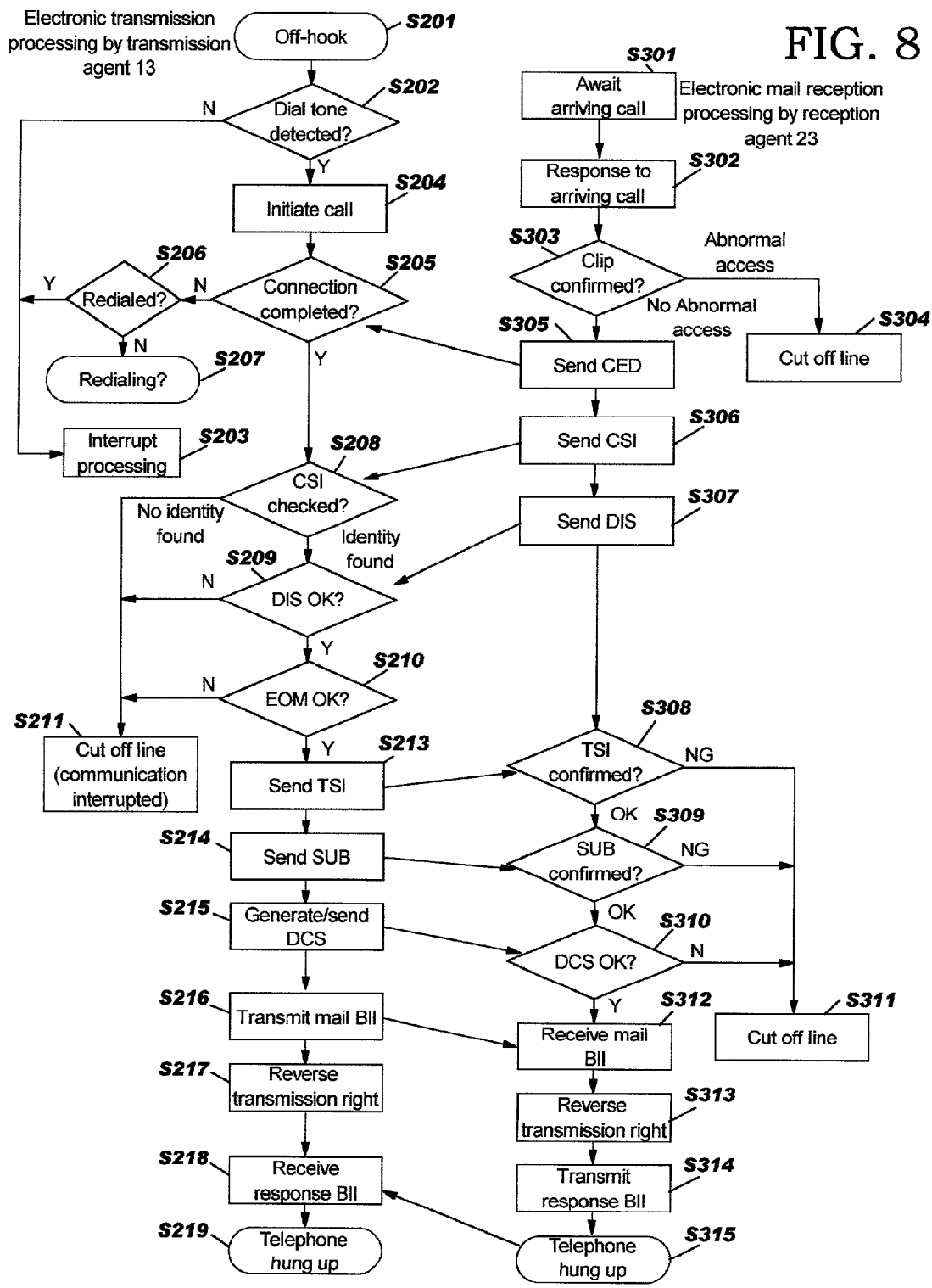
FIG. 8 is a flowchart showing execution procedures according to T.30 to which the invention is applicable.

FIG. 8 is a flow chart of the execution procedures in accordance with T.30 to which this embodiment is applicable. The flow on the left side represents the electronic mail transmission from the transmission agent 13, which is the transmitting party (sender station), and that on the right side, the processing flow of electronic mail reception by the reception agent 23, which is the receiving party (receiver station). The transmission agent 13 first places the public communication line in an off-hook state (step 201) to detect a dial tone (step 202). If no dial tone is detected, the line is not connected yet, and accordingly processing is interrupted. If a dial tone is detected, a telephone number obtained from the address information table 41 is dialed (a call is initiated) (step 204). On this occasion, the length of waiting time is adjusted as required. If dialing ends up with a busy tone, redialing is done after some interval. If no connection is achieved after a prescribed number of attempts, an end code indicating impossibility of connection is shown.

After that, upon detection of a CED (CallEd station IDentification) sent from the receiving party (the reception agent 23), the transmitting party (the transmission agent 13) judges that connection has been established (step 205). If connection has not yet been established, it is checked whether or not redialing has been done (step 206) and, if not, redialing is done (step 207). If redialing has been done, processing is interrupted (step 203), and the transmission client 12 is notified of the interruption. Then a called subscriber information (CSI) signal is received from the receiving party, and its content is checked (step 208). The transmission agent 13 can use this CSI signal as the ID sign for identifying the receiving station. This ID sign is collated with the CSI value described in the address information table 41 and, if no identity is found, the line connection is immediately cut off (step 211), and a result message mail is sent to the transmission client 12, who is the transmission requester.

Next, the transmission agent 13 checks whether or not a digital identification signal (DIS) has been received (step 209). If no DIS has been received, the communication is interrupted (step 211). If it has been, it is checked from this DIS information whether or not error correction mechanism (ECM) bits (27 bits) are ON (step 210). ECM is indispensable for error-free communication, and if the ECM bits are not ON, it is judged that the receiving party has no associated function, and the communication is interrupted by reason of an assumed shift of the other party (a telephone number change) (step 211). A DIS treats 0 through 31 bits as a field in the standard mode, and 32 bits and beyond as a field in the augmented mode. The ECM bits are allocated to 27 bits of the DIS.

Further, as an analysis of the DIS, it is checked whether or not the subaddress capacity (SUB) bit (bit 49) is on. The subaddress is necessary for the transmitting party to declare itself as a facsimile server to transmit an electronic mail and for the receiving party to confirm the declaration. If the other party lacks this capacity, the processing is interrupted by reason of an assumed shift of the other party (a telephone number change). Following that, the image transmitting capacity (bits 16 and 31), recording width capacity (bits 17 and 18) and recording length capacity (bits 19 and 20) of the receiving party are checked. Confirmation of these capacities is necessary for determining the data from in which actual electronic mail data are to be sent. The standard specification would require a B4 width and an infinite length.

Upon confirmation of the other party's equipment capacities and the other party's status as a legitimate facsimile server, electronic mail data are converted into a BII form. The most suitable form for the earlier confirmed capacities of the other party's equipment is determined. On the basis of this determination, the value of the transmitting party's digital command signal (DCS) is determined. Then, first a transmitting subscriber identification (TSI) signal in which the transmitting party's legitimate international telephone number is set is sent (step 213), a SUB in which a predetermined domain number of the other party's equipment is set is sent (step 214), and the DCS is sent (step 215). Sending of this SUB makes it possible, when reception takes place from a number of servers, to know, the moment an electronic mail is received without checking the telephone number, by the subaddress from which server it has been received.

After confirming the reception of a confirmation to receive (CFR) signal, indicating the completion of negotiation from the other party's equipment (the reception agent 23), which is the receiving party, BII transmission is performed (step 216). Also, to confirm the reception of a message confirmation message (MCF), which is a confirmation of reception by the other party's equipment, and to obtain a response from the other party's equipment, the transmitting right is reversed (step 217). Then, a response message BII is received from the other party's equipment is received (step 218) to complete the communication, and the line connection is cut off (step 219).

On the other hand, the reception agent 23, which is the receiving party, if there is no transmission mail from the transmission agent 13, which is the transmitting party, is in a state of standby for an arriving call (step 301). Upon detection of any arriving call, the reception agent 23 responds to arriving call (step 302), and can check the calling party's telephone number by a called line identification presentation (CLIP) if necessary (step 303). It compares the telephone number so obtained with telephone numbers of potential calling parties registered in its own address information table 41. If no associated number is found, the line connection is cut off by reason of an assumed abnormal access (step 304). If it is no abnormal access, the reception agent 23 sends a CED to the transmission agent 13, which is the transmitting party (step 305). After that, a CSI is sent (step 306), and a DIS is also sent (step 307). This CSI should contain the sending party's international telephone number entry in the legitimate CSI form in accordance with T.30. The DIS value indispensably needs an ECM and a B4 size.

After that, the TSI sent from the transmission agent 13, which is the transmitting party, is checked (step 308), the SUB is checked (step 309) and the contents of the DCS are checked (step 310). If these conditions fail to be met, the line connection will be cut off (step 311). If they are met, electronic mail reception in the BII form will follow (step 312). Then, the result of reception is outputted to the reception mail server 21, and its result is generated in the BII form. The transmitting right is reversed (step 313), and a BII, which is the message, is transmitted to the transmitting party (step 314). After confirmation of the completion of the transmission of this response message, the line connection is cut off (step 315). Thus, this embodiment is so constituted that the management number, serial number and the like of the sending party be sent back in a single round of facsimile communication by transmitting the BII, which is the response message, to the transmitting party. This makes it possible, where this mail transmitting method according to the formula is adopted as in the case of an ordinary electronic mail, to return a mail whose host name is found wrong at the destination, for instance, and to let the completion of communication be known on the basis of the actual content of communication instead of the form.

Figure 9:
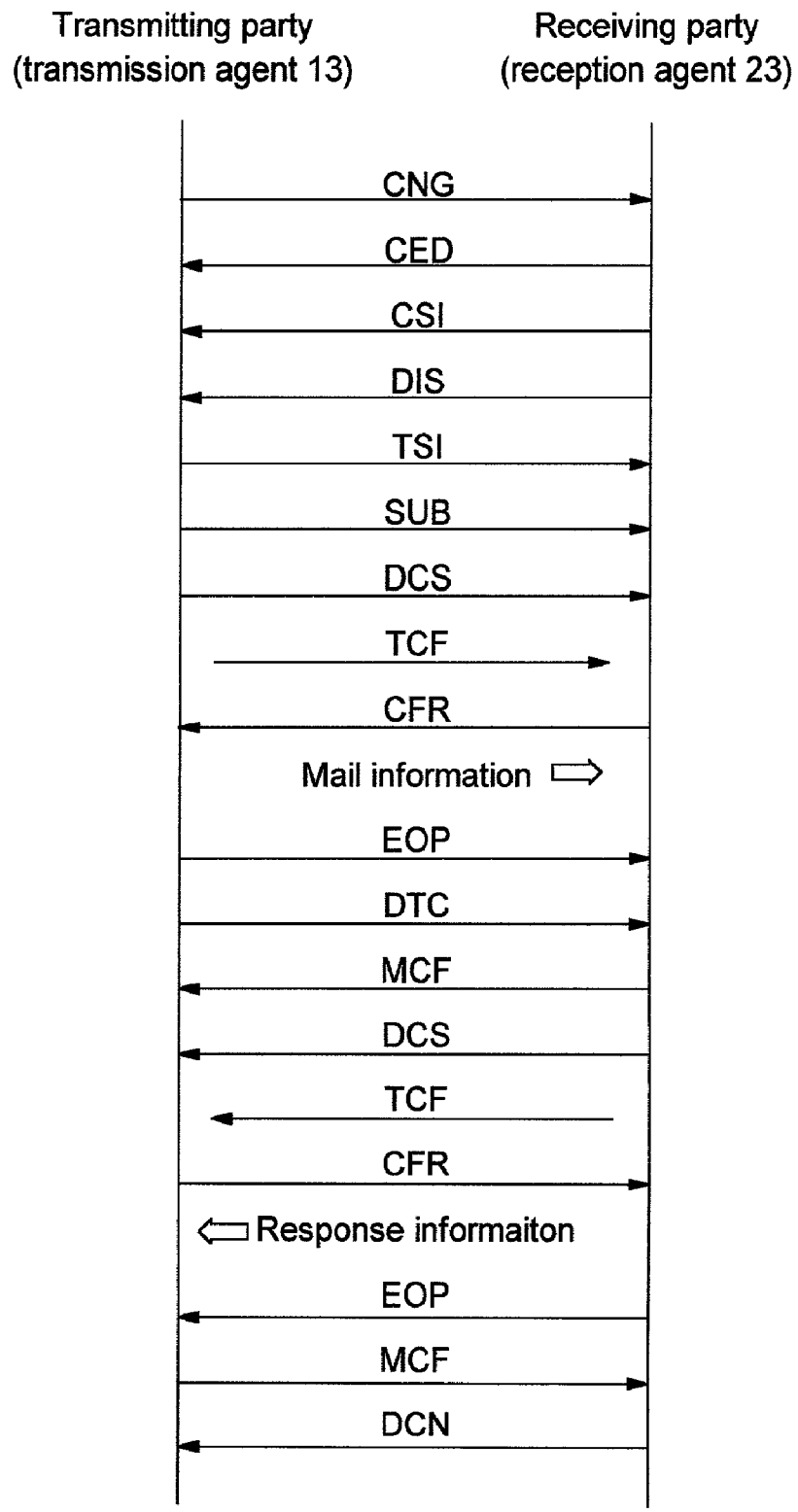
FIG. 9 shows a T.30 command sequence that is accomplished by the electronic mail communicating method of an exemplary embodiment.

FIG. 9 shows a T.30 command sequence that is accomplished by the electronic mail communicating method of this embodiment. The left side of the diagram represents the transmission agent 13, which is the transmitting party, and the right side, the reception agent 23, which is the receiving party (the called station). As illustrated, after a calling (CNG: 1100 Hz) signal from the transmitting party is sent first, a CED (2100 Hz), a CSI and a DIS are returned from the receiving party. After that, a TSI, a SUB and DCS are sent from the transmitting party. After that, modem training by the receiving party is confirmed, and a training check (TCF) to find out whether or not a channel can be used at this transfer speed is outputted from the transmitting party. Sending of a CFR, which is a response signal accompanying the completion of procedures by the receiving party, from the receiving party against this is awaited, the transmission of mail information in the above-described BII form takes place.

After the transmission of the mail information, the receiving party is notified of the absence of any other mail information to be transmitted by an end of procedures (EOP) signal. Then, to transfer the message transmitting right to the receiving party, a digital transmit command (DTC) is sent. Having received this DTC, the receiving party, after sending a message confirmation (MCF) signal and a DCS, sends a TCF, against which the transmitting party sends a CFR, which is a response signal. Having received this CFR, the reception agent 23, which is the called station, transmits a response message in the above-described BII form to the transmission agent 13, which is the call initiating station. After that, the reception agent 23 sends an EOP, the transmission agent 13 sends an MCF, and the reception agent 23 sends a disconnect (DCN) signal, which results in cutting off the connection. Electronic mail communication using facsimile procedures by this embodiment is thereby ended.

As hitherto described in detail, this embodiment makes possible electronic mail communication permitting extensive interconnections in accordance with the G3 protocol, and further makes possible the continuation of connection only during the length of time actually needed for the transmission of each electronic mail. Thus, the turnaround time, which is the length of time taken by a set of information to go round the system to deliver an electronic mail, is far shorter than what is currently in service for electronic mail communication, and the efficiency of dial-up line use can be significantly enhanced. This system readily makes possible communication by dial-up connection on an independent route from the IP communication network as such as desired by the transmitting party. It can also provide users with electronic mail communication functions excellent in safety.

Although the foregoing description of this embodiment supposes the use of a G3 communication control formula based on the ITU-T Recommendation T-30, obviously any other formula can be adopted as long as it follows the spirit of the present invention.

We claim:

1. An electronic mail communicating method, comprising the steps of:
   (a) retrieving mail information stored in a server to be transmitted over a switched line from the server, wherein the mail information originates in an electronic mail format;
   (b) selecting a specification of communication needed for communication over the switched line from a network address contained in said mail information; and
   (c) initiating a call to said switched line using the selected specification of communication, and transmitting said mail information according to facsimile communication procedures to a receiving apparatus connected via the switched line, wherein the receiving apparatus converts said mail information from the selected specification of communication to the electronic mail format; wherein the step of converting comprises the step of determining a horizontal number of pixels and generating data by linking the data with the horizontal number in a vertical direction according to a specification based on ITU-T Recommendation T-30; and
   (d) forwarding said mail information from the receiving apparatus to the network address according to the electronic mail format.

2. The electronic mail communicating method as set forth in claim 1, wherein the step of retrieving comprises the step of retrieving said mail information with recognition that the mail information is to be transmitted from said network address via said switched line.

3. An electronic mail communicating method, comprising the steps of:
   (a) receiving data containing electronic mail information converted on a sender from an electronic mail format into an image form permitting facsimile communication from the sender, wherein said electronic mail information originates in the electronic mail format, wherein the step of converting comprises the step of determining a horizontal number of pixels and generating data by linking the data with the horizontal number in a vertical direction according to a specification based on ITU-T Recommendation T-30;
   (b) converting said received data into electronic mail information;
   (c) analyzing a destination contained in the converted electronic mail information;
   (d) generating reply information to converted electronic mail information;
   (e) converting said reply information into said image form on a receiver and sending the converted reply information to the sender.

4. The electronic mail communicating method as set forth in claim 3, wherein, if a terminal with a destination corresponding to said analyzed destination is not connected to an internal network, reply information representing absence of any relevant destination is generated.

5. The electronic mail communicating method as set forth in claim 3, wherein, if received data does not contain electronic mail information, conventional facsimile reception operation takes place.

6. An electronic mail transmitting apparatus, comprising:
a mail retrieving unit for retrieving from a server mail information to be transmitted over a switched line, wherein said mail information originates in an electronic mail format;
a communication specification determination unit for determining a specification of communication for communication over the switched line based on a network address contained in said mail information retrieved by said mail retrieving unit; wherein said communication specification determination unit stores in advance correspondence information among destination address information for a network assigned to electronic mail data, a dial number of said receiver and a communication procedure based on ITU-T Recommendation T-30, and determines the specification of communication based on the stored correspondence information; and
a transmission unit for initiating a call on said switched line using said specification of communication determined by said communication specification determination unit and transmitting said mail information to a receiving apparatus connected via the switched line by facsimile communication, wherein the receiving apparatus converts the mail information back into the electronic mail format.

7. A mail receiving apparatus for receiving electronic mail data originating in an electronic mail format that has been converted into a form permitting facsimile communication from a sender via a switched line, comprising:
a receiving unit for receiving mail data originating in an electronic mail format that has been converted into a form permitting facsimile communication from said sender via said switched line by facsimile communication;
a restoring unit for restoring said mail data received by said receiving unit back into electronic mail data; and
a transferring unit for transferring said electronic mail data restored by said restoring unit to a server connected to an internal network.

8. The electronic mail receiving apparatus, as set forth in claim 7, further comprising: a destination recognition unit for recognizing a destination of the electronic mail data based on said electronic mail data restored by said restoring unit; and a notification unit for notifying the sender if the destination recognized by said destination recognition unit is not in said internal network.

9. An electronic mail communication system, comprising:
an Internet-connected transmission mail server;
a transmission client connected to the transmission mail server to instruct transmission of electronic mail; and
a transmission agent connected to a switched line to function as a client to the transmission mail server, wherein said transmission client outputs, to said transmission mail server, electronic mail data in an electronic mail format that includes a description of a destination of said transmission agent and a description of a final mail destination, and wherein said transmission agent retrieves electronic mail data in which the destination of the transmission agent is described by said transmission client from said transmission mail server, converts said electronic mail data into a form permitting facsimile communication, and transmits the electronic mail data using facsimile communication procedures using the switched line to a receiving apparatus that reconverts the electronic mail data back into an electronic mail format.

10. An electronic mail communication system for transmitting and receiving electronic mail information between an internal network on a sender side and an internal network on a receiver side, wherein
the internal network on the sender side comprises a transmission mail server, a transmission client for generating electronic mail information, and a transmission agent which is a client having a function for converting the electronic mail information into a form permitting facsimile communication and transmitting the electronic mail information in a facsimile format via a switched line;
the internal network on the receiver side comprises a reception mail server, a reception client which is a final destination of the electronic mail information, and a reception agent which is a client having a function for receiving the electronic mail information via a switched line, wherein the electronic mail information is converted from the facsimile format back into the electronic mail format on the receiver side;
said transmission agent transmits an electronic mail message whose final destination is said reception client designated by said transmission client to said reception agent via said switched line;
said reception agent transfers said electronic mail received via said switched line to said reception mail server in an electronic mail format.

* * * * *